3,312,728
ETHIONYLAMINO-ARYLAMINES
Rudolf Kühne and Fritz Meininger, Frankfurt am Main, Germany, assignors to Farbwerke Hoechst Aktiengesellschaft vormals Meister Lucius & Bruning, Frankfurt am Main, Germany, a corporation of Germany
No Drawing. Filed May 7, 1963, Ser. No. 278,734
Claims priority, application Germany, May 10, 1962, F 36,757
7 Claims. (Cl. 260—458)

The present invention relates to ethionylamino-arylamines and to a process for preparing them; more particularly it relates to ethionylamino-arylamines of the general formula

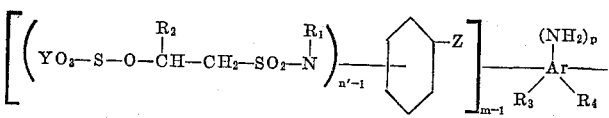

in which Ar represents a member of the group consisting of the benzene radical and naphthalene radical, $R_1$ represents a member of the group consisting of a hydrogen atom, a lower alkyl group, a cyclohexyl group and a phenyl lower alkyl group, $R_2$ represents a member of the group consisting of a hydrogen atom and an alkyl group having 1 to 4 carbon atoms, $R_3$ represents a member of the group consisting of a hydrogen atom, a chlorine atom, a bromine atom, a lower alkoxy group, a hydroxyl group and a sulfonic acid group, $R_4$ represents a member of the group consisting of a hydrogen atom and a lower alkoxy group, Z represents a member of the group consisting of a direct covalent bond, an oxygen atom, a sulfone group, a sulfonamide group, a carbonamide group, a carbonyl group, a lower alkylene group and an ureido group, Y represents a member of the group consisting of a hydrogen atom and an alkali metal atom, $p$ stands for one of the integers 1 or 2, $m$ stands for one of the integers 1, 2 or 3, $n$ stands for one of the integers 1 or 2 and $n'$ stands for one of the integers 2 or 3 with the proviso that $m$ is one of the integers 2 or 3 if $n$ is 1, and that $m$ is 1 if $n$ is 2.

In a more specific aspect of the invention, the ethionylamino-arylamines are those having the formula

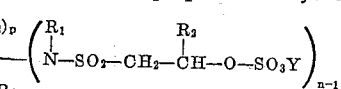

in which $R_1$ represents a member selected from the group consisting of hydrogen, alkyl of 1 to 4 carbon atoms, cyclohexyl and benzyl, $R_2$ represents a member selected from the group consisting of hydrogen and alkyl of 1 to 4 carbon atoms, $R_3$ represents a member selected from the group consisting of hydrogen, chlorine, methyl, methoxy, ethoxy, amino, hydroxyl and sulfonic acid groups, $R_4$ represents a member of the group consisting of hydrogen and methoxy, and $R_3$ and $R_4$ together represent

—CH=CH—CH=CH— linked to adjacent carbon atoms on the benzene ring Ar, Y represents a member selected from the group consisting of hydrogen, sodium and potassium, Z represents a member selected from the group consisting of a direct covalent bond,

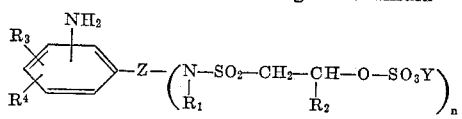

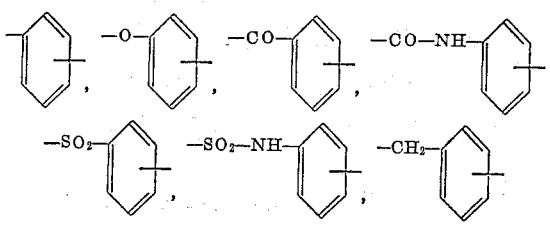

and

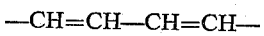

and $n$ stands for one of the integers 1 and 2.

It has been found that ethionylamino-arylamines are obtained by reducing nitro-aryl compounds containing one or several ethionylamino groups of the formula

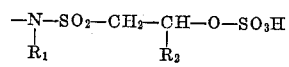

in which $R_1$ represents a hydrogen atom, an alkyl, a cyclo-

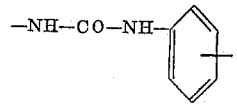

alkyl or an aralkyl group and $R_2$ represents a hydrogen atom or an alkyl group of 1 to 4 carbon atoms, in an aqueous or alcoholic medium with iron powder or by catalytic hydrogenation.

The ethionylamino groups are bound either to the same aryl radical as the nitro group or to an aryl radical linked directly or over a bridge member such as a carbonamide, sulfonamide, carbonyl, sulfone, methylene, oxygen or urea group, to a nitro-aryl radical. The aryl radicals substituted by one or several nitro groups may be benzene, naphthalene or diphenyl radicals which may be substituted by alkyl, halogen, hydroxy, alkoxy, carboxylic acid or sulfonic acid groups.

When carrying out the process of the present invention the nitro-aryl compounds containing one or several ethionylamino groups are reduced in an aqueous or alcoholic solution or suspension by treatment with iron powder or by catalytic hydrogenation in the presence of catalysts, such as Raney nickel. The reduction is advantageously carried out at a temperature up to 80° C., preferably at a temperature between 35° and 65° C. and at a pH-value ranging from 5.5 to 7.5

The ethionylamino-arylamines obtainable by the process of the present invention can be obtained by evaporating the aqueous or alcoholic solution or in the case of compounds which are easily soluble in water by salting out with alkali chlorides. The ethionylamino-arylamines can also be obtained by acidifying with a strong mineral acid, for example sulfuric acid or hydrochloric acid, whereby they are obtained in the form of inner salts.

It is known that the nitro-aryl compounds which are analogous to the compounds obtainable by the process of the present invention, in which a halogen atom, such as chlorine or bromine, is substituted for the sulfuric acid ester group, are easily dehalogenated during the reduction. It is, therefore, surprising that in the process of the present invention the sulfuric acid ester group is not split off. The sulfuric acid ester group is not saponified either, though the sulfuric acid ester of the β-hydroxyethane-sulfonic acid is hydrolysed in an aqueous medium, especially rapidly in an acid medium and at an elevated temperature. In the reduction process applied no splitting of the sulfonamide group of the ethionylamino group takes place although, as is known, such splitting is very likely in the presence of reducing agents.

The novel ethionylamino-arylamines, which according to the process of the present invention are obtained in very good yield and purity, are valuable intermediate products for preparing dyestuffs. They may be applied to cotton, for example, in the form of an aqueous solution or a printing paste and fixed fast by treating the padded and printed fibrous material with an alkali, preferably at an elevated temperature, the ethionylamino groups being reacted with those groups of the fibrous material that are capable of reacting. The fixed compounds may then be diazotized on the fiber and coupled with any coupling component to form a water-insoluble azo-dyestuff possessing good fastness properties. The compounds obtainable by the process of the present invention can also be used as intermediate products for preparing textile auxiliaries.

The following examples serve to illustrate the invention, but they are not intended to limit it thereto, the parts being by weight unless otherwise stated, and the relationship of parts by weight to parts by volume being the same as that of the kilogram to the liter.

Example 1

1134 parts of the potassium salt of 4-nitro-1-N-methyl-ethionylaminobenzene of the following formula

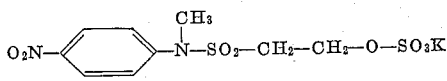

(after recrystallization from water the melting point is between 182° and 184° C.) are mixed with 3000 parts by volume of water and reduced at 50° C. and 20 atmospheres gauge pressure in the presence of 150 parts of Raney nickel. When the taking up of hydrogen ceases, the nickel is filtered off while still warm. Subsequently 30 parts of active charcoal are introduced and the mixture is stirred for 15 minutes at 60° to 70° C. After having filtered off the active charcoal, the product is salted out at 10° C. by adding potassium chloride. The crystalline precipitate is filtered off and dried in vacuo at 50° to 60° C. 1100 Parts of the potassium salt of 4-amino-1-N-methyl-ethionylaminobenzene are obtained. The yield of the pressure product is 90% of the theory. After recrystallization water colorless crystals are obtained which melt at 220.5° to 221° C. with decomposition.

In an analogous manner there are obtained by reducing the corresponding nitro-aryl compounds the compounds having the following constitution:

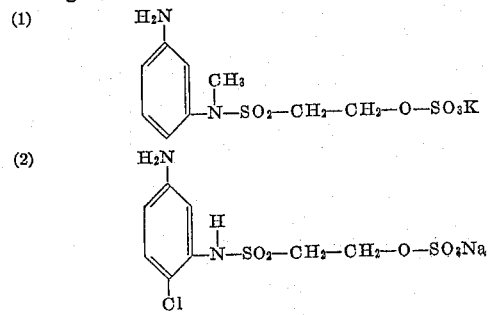

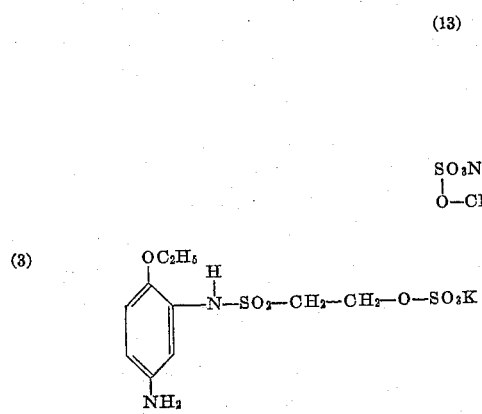

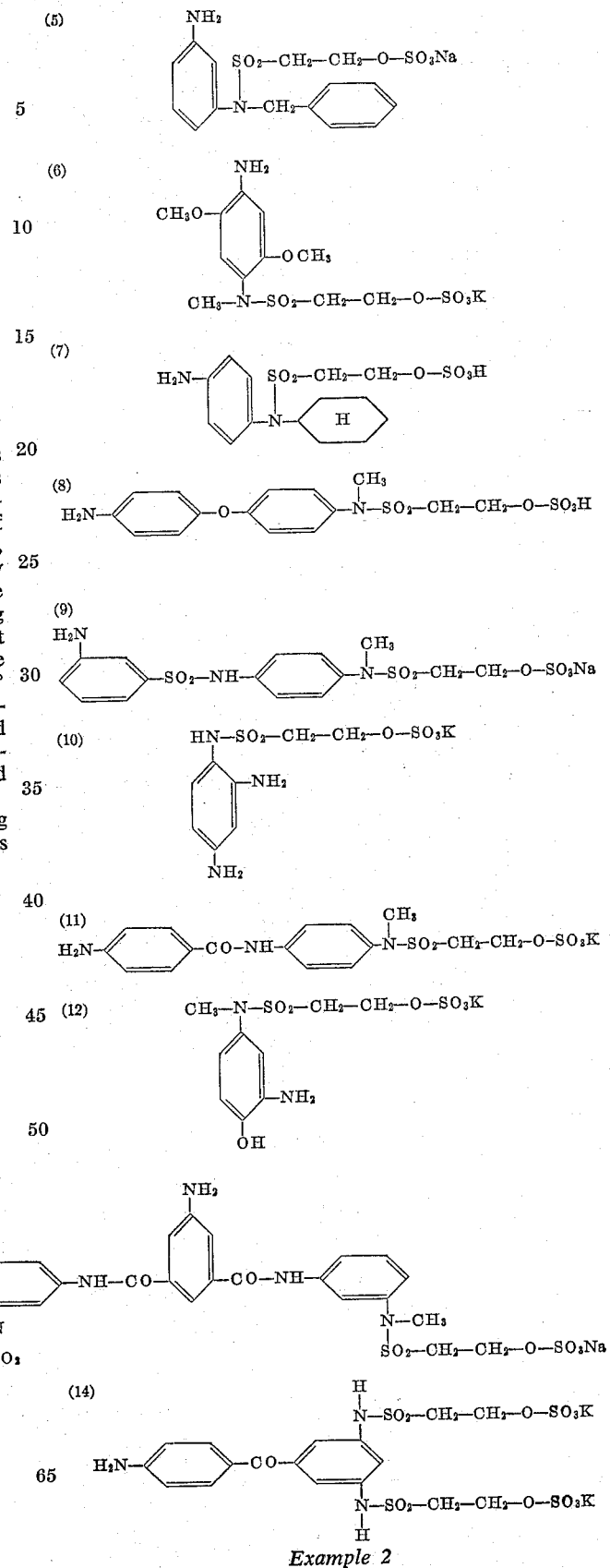

Example 2

168 parts of the potassium salt of 4-nitro-1-N-butyl-ethionylaminobenzene of the following formula

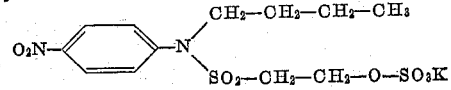

(after recrystallization from water the melting point is between 172° and 173° C.) are introduced portionwise at 50° C. and a pH-value of between 6.0 and 6.5 into 480 parts by volume of water containing 115 parts of iron powder, the pH-value being maintained constant by adding 2 N-acetic acid. Subsequently the whole is stirred at 50° C. for 2 hours. After cooling to 30° C., the pH-value is adjusted to 7.5 by adding potassium carbonate. 20 parts of kieselguhr and 5 parts of active charcoal are added, and the mixture is filtered. After cooling, the amine precipitates in the form of colorless crystals. It is filtered off, washed with saturated potassium chloride solution and dried in vacuo at 60° C. The yield amounts to about 85% of the theory; the melting point is between 158° and 159° C. after recrystallization from water.

When using instead of the potassium salt of 4-nitro-1-N-butyl-ethionylaminobenzene equivalent amounts of the following compound

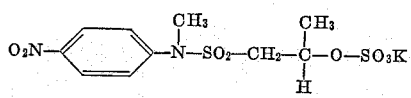

or

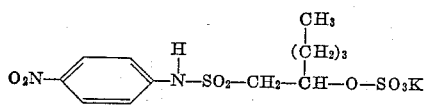

The corresponding ethionylamino-arylamines are obtained in very good yield.

*Example 3*

183.5 parts of the potassium salt of 2-(N-methyl-ethionylamino)-5-nitro-1-methoxybenzene of the formula

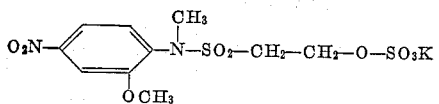

(after recrystallization from water the compound melts at 195° to 196° C. with decomposition) are suspended in a mixture containing 240 parts by volume of water and 15 parts by volume of 2 N-acetic acid and reduced at 40° to 50° C. and 20 to 30 atmospheres gauge hydrogen pressure in the presence of 27 parts of Raney nickel. When the reaction is complete, 3 parts of active charcoal and 5 parts of kieselguhr are added, the mixture is stirred for 15 minutes at 40° to 50° C. and filtered. The filtrate is adjusted to a pH-value of 1 at 0° to 5° C. by adding concentrated hydrochloric acid and stirred for 2 hours. The inner salt of 2-(N-methyl-ethionylamino)-5-amino-1-methoxybenzene precipitates in the form of colorless crystals. The product is filtered off and dried at 40° C. in a vacuum drying chamber. The yield amounts to about 132.5 parts which corresponds to 86% of the theory; the product melts at 192/° C. with decomposition.

When replacing the potassium salt of 2-(N-methyl-ethionylamino)-5-nitro-1-methoxybenzene by an equivalent amount of the potassium salt of 2-(N-methyl-ethionyl-amino)-4-nitro-1-methylbenzene, there is obtained in very good yield the potassium salt of 2-(N-methyl-ethionyl-amino)-4-amino-1-methylbenzene which melts at 182° to 185° C. with decomposition.

In an analogous manner the ethionylamino-arylamine of the following formula

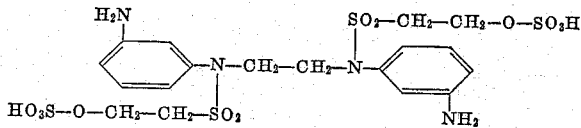

as well as the 4-amino-4'-ethionylamino-benzophenone, the 4-amino-4'-ethionylamino-diphenylsulfone and the 4-amino-4'-ethionylamino-diphenylmethane are obtained.

*Example 4*

30 parts of the potassium salt of 3-nitro-1-ethionyl-aminobenzene of the formula

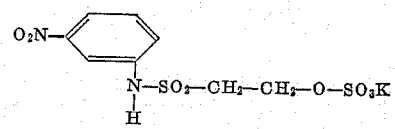

(after recrystallization from water the product melts at 220° to 221° C. with decomposition) are reduced in 150 parts by volume of methanol at 60° C. and 60 atmospheres gauge pressure in the presence of 2.5 parts of Raney nickel. The taking up of hydrogen ceases after about 1½ hours. The mixture is evaporated to dryness in vacuo, taken up with a small amount of hot water and filtered while still hot. From the filtrate the 3-amino-1-ethionylaminobenzene crystallizes in the form of the potassium salt with very good yield. The product melts at 238° to 239° C. with decomposition.

When replacing the potassium salt of 3-nitro-1-ethionyl-aminobenzene by an equivalent amount of the potassium salt of 4-nitro-4'-N-methyl-ethionylamino-diphenyl, the potassium salt of 4-amino-4'-N-methyl-ethionylamino-diphenyl is obtained in very good yield.

*Example 5*

20 parts of the potassium salt of 2-nitronaphthalene-4,8 - disulfonic acid-(4'-N-methyl-ethionylamino)-anilide obtainable by condensing 2-nitronaphthalene-4,8-disulfonic acid chloride with 4-amino-1-N-methyl-ethionyl-aminobenzene are introduced into 210 parts by volume of water and reduced at 50° C. and 50 atmospheres gauge hydrogen pressure in the presence of 8 parts of Raney nickel. When the taking up of hydrogen ceases, 3 parts of active charcoal are added, and the mixture is filtered at 80° C. The product is salted out with potassium chloride, filtered off, washed with potassium chloride solution and dried in vacuo. 18 Parts of potassium salt of 2-aminonaphthalene-4,8-disulfonic acid-(4'-N-methyl-ethionylamino)-anilide. The yield of the pure product is 84.5% of the theory.

In an analogous manner the 1-nitro-4-ethionylamino-naphthalene and the unsymmetrical urea derivative from 1-amino-4-N-methyl-ethionylaminobenzene and the 3-nitro-4-aminobenzene-sulfonic acid can be reduced catalytically to form the corresponding ethionylamino-arylamines. The unsymmetrical urea derivative can be prepared by condensing 1-amino-4-N-methyl-ethionyl-aminobenzene with the reaction product of 3-nitro-4-aminobenzene-sulfonic acid and chloroformic acid phenylester.

We claim:
1. Compounds of the formula

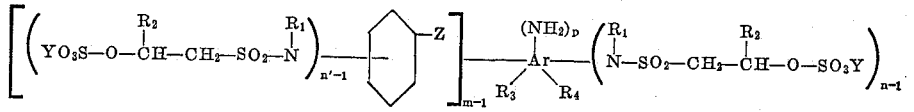

in which Ar represents a member of the group consisting of the benzene radical and naphthalene radical, $R_1$ represents a member of the group consisting of a hydrogen atom, a lower alkyl group, a cyclohexyl group and a phenyl lower alkyl group, $R_2$ represents a member of the group consisting of a hydrogen atom and an alkyl group having 1 to 4 carbon atoms, $R_3$ represents a member of the group consisting of a hydrogen atom, a chlorine atom, a bromine atom, a lower alkoxy group, a hydroxyl group and a sulfonic acid group, $R_4$ represents a member of the group consisting of a hydrogen atom and a lower alkoxy group, Z represents a member of the group consisting of a direct covalent bond, an oxygen atom, a sulfone group, a sulfonamide group, a carbonamide group, a carbonyl group, a lower alkylene group and an ureido group, Y represents a member of the group consisting of a hydrogen atom and an alkali metal atom, $p$ stands for one of the integers 1 or 2, $m$ stands for one of the integers 1, 2 or 3, $n$ stands for one of the integers 1 or 2 and $n'$ stands for one of the integers 2 or 3 with the proviso that $m$ is one of the integers 2 or 3, if $n$ is 1, and that $m$ is 1 if $n$ is 2.

2. Compounds of the formula

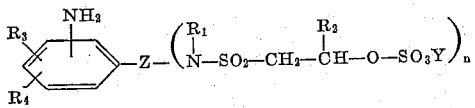

in which $R_1$ represents a member selected from the group consisting of hydrogen, alkyl of 1 to 4 carbon atoms, cyclohexyl and benzyl, $R_2$ represents a member selected from the group consisting of hydrogen and alkyl of 1 to 4 carbon atoms, $R_3$ represents a member selected from the group consisting of hydrogen, chlorine, methyl, methoxy, ethoxy, amino, hydroxyl and sulfonic acid groups, $R_4$ represents a member of the group consisting of hydrogen and methoxy, and $R_3$ and $R_4$ together represent

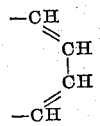

linked to adjacent carbon atoms on the benzene ring, Y represents a member selected from the group consisting of hydrogen, sodium and potassium, Z represents a member selected from the group consisting of a direct covalent bond,

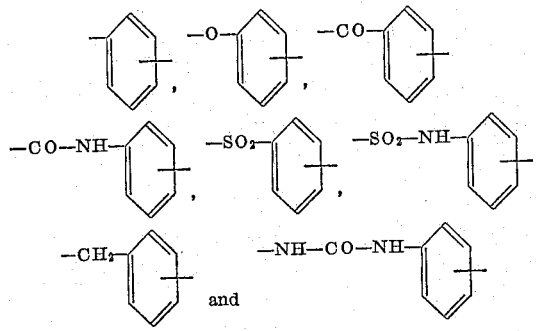

and $n$ stands for one of the integers 1 and 2.

3. The compound having the formula

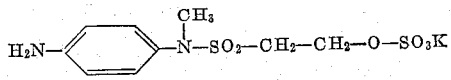

4. The compound having the formula

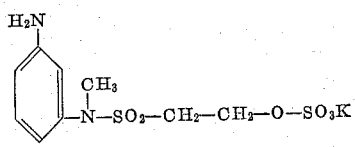

5. The compound having the formula

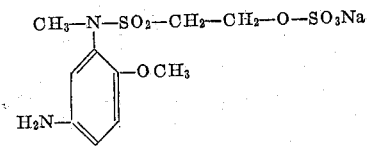

6. The compound having the formula

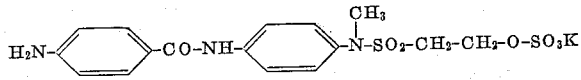

7. The compound having the formula

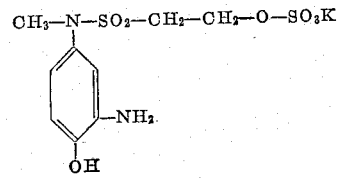

References Cited by the Examiner
UNITED STATES PATENTS

| | | | |
|---|---|---|---|
| 2,229,744 | 1/1941 | Kern | 260—457 XR |
| 2,330,714 | 9/1943 | Holt | 260—580 |
| 2,346,492 | 4/1944 | Knight et al. | 260—580 XR |
| 2,357,912 | 9/1944 | Seymour et al. | 260—580 XR |
| 2,373,438 | 4/1945 | Weinmayr | 260—580 |
| 2,619,503 | 11/1952 | Benner et al. | 260—580 |
| 2,658,925 | 11/1953 | Cenker et al. | 260—580 XR |
| 2,683,745 | 7/1954 | Emerson et al. | 260—580 XR |
| 3,049,393 | 8/1962 | Seemuler et al. | |

FOREIGN PATENTS

| | | |
|---|---|---|
| 686,061 | 1/1953 | Great Britain. |
| 1,109,702 | 6/1961 | Germany. |

CHARLES B. PARKER, *Primary Examiner.*

IRVING MARCUS, *Examiner.*

FLOYD D. HIGEL, *Assistant Examiner.*